May 28, 1957 R. R. DREISBACH ET AL 2,794,014
WATER-SOLUBLE HETEROPOLYMERS OF ACRYLIC ACID, ALLYL
ALCOHOL, AND SULFUR DIOXIDE AND PROCESSES FOR
PRODUCING THE SAME
Filed Oct. 15, 1953
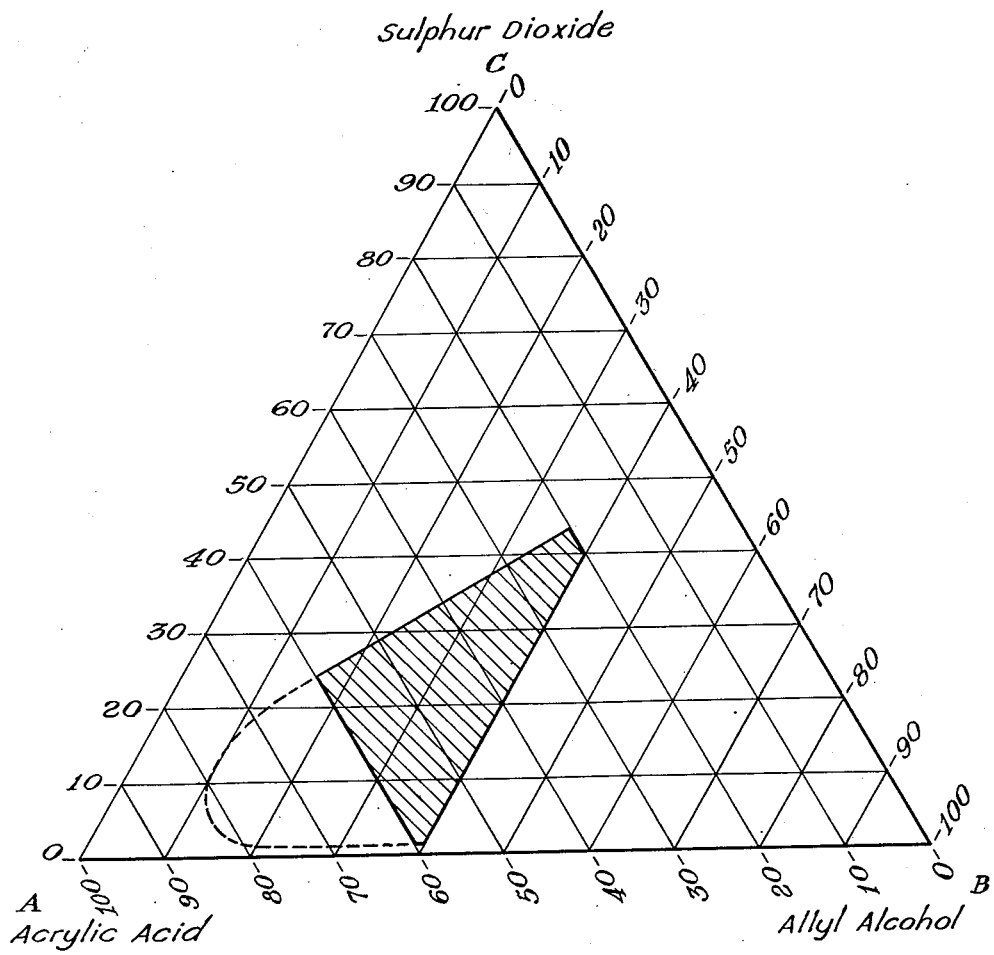
INVENTORS.
Robert R. Dreisbach
BY John F. Mulloy
Griswold & Burdick
ATTORNEYS 2,794,014

WATER-SOLUBLE HETEROPOLYMERS OF ACRYLIC ACID, ALLYL ALCOHOL, AND SULFUR DIOXIDE AND PROCESSES FOR PRODUCING THE SAME

Robert R. Dreisbach and John F. Mulloy, Midland, Mich., assignors to The Dow Chemical Company, Midland, Mich., a corporation of Delaware Application October 15, 1953, Serial No. 386,328

3 Claims. (Cl. 260—79.3)

This invention relates to water-soluble resins that are useful as coating or sizing materials and to processes for producing the same from certain olefinic compounds and sulfur dioxide.

Sulfur dioxide and unsaturated compounds, such as olefins, are known to react in the presence of suitable catalysts to produce polysulfones of high molecular weight and resinous character. Generally such resins exhibit properties that make them useful as molding materials, but they are frequently so insoluble in water or other common solvents as to have little utility in casting and coating operations. Because of the relatively short thermal life of such resins it would be most desirable if fabrication techniques other than thermal operations could be employed.

It is therefore an object of this invention to provide a new water-soluble polysulfone.

It is a further object to provide such a composition that may be cast into continuous films.

It has now been found that acrylic acid, allyl alcohol, and sulfur dioxide may be polymerized in certain limited ratios to give water soluble polysulfone resins. These resins retain many of the valuable properties of the water insoluble polysulfone resins and in addition may be employed in conventional casting and dipping operations to produce useful films and coatings.

The compositions may be prepared by polymerizing a mixture of sulfur dioxide, acrylic acid and allyl alcohol in solution in aqueous media. When prepared by this method, the resulting product may be utilized without further modification.

When the polymer is prepared in an aqueous solution, the solution may be used directly for dipping, casting, or in any other film forming operation. The solution may be prepared by dissolving enough of the monomers in water to make a 20 to 50 percent solution, together with a water soluble polymerization catalyst such as ammonium persulfate, and raising the temperature to about 50° C. with initial agitation to initiate polymerization.

It is necessary to remove any unreacted monomers after the polymerization, so that the polymers may be handled safely. The unreacted monomers cause irritation to the eyes and mucous membranes. Such monomers are easily removed from the polymers by steam distillation or by distillation under reduced pressure.

Following the distillation step, the solutions may be used immediately as spinning dopes from which to prepare fibers and filaments or for casting continuous films. However, if the solutions are to be stored for any appreciable period of time, such as a day or longer, it is preferred to add a small amount of hydroquinone to the solution. When first prepared, the polymers are water soluble, but if allowed to stand, the solutions will gradually become hazy. Hydroquinone has been found to prevent this haze.

The compositions of the invention will be more fully defined with reference to the attached ternary composition diagram, in which Apex A represents 100 percent acrylic acid, Apex B represents 100 percent allyl alcohol and Apex C represents 100 percent sulfur dioxide. All percentages are given by weight. The useful compositions are those consisting of from 16 to 40 percent allyl alcohol, from 1 to 43 percent (preferably 15 to 40 percent) sulfur dioxide and from 20 to 60 percent acrylic acid, all as further limited by being in such proportions as to fall within the shaded area in the diagram. When more than 40 percent of allyl alcohol is used, the polymer formed is no longer water-soluble. Even small amounts of sulfur dioxide give polymers with new properties, but when larger amounts of sulfur dioxide are used than shown in the drawing, no additional benefits accrue because there must be one mol of allyl alcohol or one mol of acrylic acid, or one-half mol of each, for each mol of sulfur dioxide, if useful polymers are to be obtained.

While 60 percent is a practical limit, the acrylic acid may be used in greater amounts, up to 80 percent. The polymers formed in such cases are more expensive to prepare and are so acid as to be corrosive to spinnerets or other equipment used in fabricating the polymers into useful articles. The high acrylic acid compositions are illustrated on the diagram as being the unshaded area enclosed by the dotted line.

Substituted acrylic acids, such as methacrylic acid, may be used in place of part or all of the acrylic acid in the new ternary polymer. No appreciable change in properties has been found when methacrylic acid is substituted for acrylic acid.

Films prepared from the polymers of this invention are clear and flexible, and range from hard to soft as the proportion of allyl alcohol in the compositions is increased.

It should be apparent that the polyfunctionality of these resins presents the opportunity for further modification of the resins subsequent to polymerization and fabrication. For example, alcohols or acids may be reacted with the resins to produce ester linkages to decrease the water solubility, to increase the elasticity, or for other reasons.

The compositions of the invention will be more apparent from the following illustrative examples.

EXAMPLE 1

Into a polymerization vessel was charged 150 parts of water, 3 parts ammonium persulfate and 24 parts of allyl alcohol. The mixture was cooled to 15° C. and 50 parts acrylic acid was added. The mixture was further cooled to −20° C. and 26 parts of liquid sulfur dioxide added. The vessel was sealed and polymerization initiated by raising the temperature to 40° C. with initial agitation. Polymerization was continued for 16 hours after which the reaction mixture was cooled and 100 parts water introduced. The mixture was steam distilled at 200 mm. pressure until 100 parts water were recovered in the receiver. The polymer was completely soluble in the hot water. When cooled no polymer settled. The solution had very little odor. Clear films were cast on glass plates. The solution also was used as a spinning dope to prepare fibers. When the fibers were heat treated, they become insoluble in water. A dried sample of the material analyzed 27 percent sulfur dioxide, 50 percent acrylic acid, and 23 percent allyl alcohol.

EXAMPLE 2

A polymer consisting of 32 percent sulfur dioxide, 37 percent acrylic acid, and 31 percent allyl alcohol was prepared by the method of Example 1. The solution formed a continuous film when cast on a glass plate and dried.

EXAMPLE 3

Several polymerizations were carried out by the method of Example 1, using various proportions of the three monomers. The results are listed in Table 1.

*Table 1*

| No. | Polymer Composition | | |
|---|---|---|---|
| | Percent $SO_2$ | Percent Acrylic Acid | Percent Allyl Alcohol |
| 1 | 19.1 | 41.0 | 27.9 |
| 2 | 22.0 | 49.6 | 28.4 |
| 3 | 22.1 | 54.5 | 23.4 |
| 4 | 35.8 | 34.6 | 29.6 |
| 5 | 38.8 | 21.7 | 39.5 |

All of the above compositions formed films when cast from aqueous solution onto a glass plate.

We claim:

1. A water-soluble copolymer of allyl alcohol, sulfur dioxide and at least one acid from the group consisting of acrylic and methacrylic acids, the amount of allyl alcohol being from 16 to 40 percent, that of sulfur dioxide being from 1 to 43 percent, and that of the acid being from 20 to 60 percent of the polymer weight, the relative amounts of each constituent being chosen so as to be represented by any point within the shaded area on the annexed drawing.

2. The copolymer claimed in claim 1, wherein the acid is acrylic acid.

3. The method which comprises heating together in an aqueous medium, in the presence of a soluble peroxygen compound as polymerization catalyst, a mixture of allyl alcohol, sulfur dioxide and at least one acid from the group consisting of acrylic and methacrylic acids, in aggregate amounts to form a 20 to 50 percent solution by weight in water, and in relative proportions represented by any point within the shaded area on the annexed drawing, to produce an aqueous solution of a polymer of allyl alcohol, $SO_2$, and the said acid.

References Cited in the file of this patent

UNITED STATES PATENTS

| 2,114,292 | Frey et al. | Apr. 19, 1938 |
| 2,556,799 | Crouch et al. | June 12, 1951 |